US009684333B2

(12) United States Patent
Han et al.

(10) Patent No.: US 9,684,333 B2
(45) Date of Patent: Jun. 20, 2017

(54) ELECTRONIC DEVICE AND CASE MEMBER

(71) Applicant: Samsung Electronics Co., Ltd., Gyeonggi-do (KR)

(72) Inventors: Kwang-Soo Han, Gyeonggi-do (KR); Sang-In Baek, Gyeonggi-do (KR); Jin-Hyuk Choi, Gyeonggi-do (KR); Young-Oh Kim, Gyeonggi-do (KR); Jae-Woo Lee, Seoul (KR); Jee-Young Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/947,396

(22) Filed: Nov. 20, 2015

(65) Prior Publication Data

US 2016/0187922 A1 Jun. 30, 2016

(30) Foreign Application Priority Data

Dec. 24, 2014 (KR) ........................ 10-2014-0188045

(51) Int. Cl.
*G06F 1/16* (2006.01)
*H05K 5/00* (2006.01)
*H05K 7/00* (2006.01)
*A45C 11/00* (2006.01)

(52) U.S. Cl.
CPC ............ *G06F 1/1613* (2013.01); *A45C 11/00* (2013.01); *A45C 2011/002* (2013.01)

(58) Field of Classification Search
CPC .... G06F 1/1613; A45F 5/00; A45F 2005/002; A45F 2200/00; A45F 2200/05; A45F 2200/0516; A45F 2200/0525

USPC .............. 361/679.01, 679.02, 679.21–679.3, 361/679.55, 679.56; 455/575.1–575.9; 224/191, 929

See application file for complete search history.

(56) References Cited

U.S. PATENT DOCUMENTS

| 5,295,089 A * | 3/1994 | Ambasz ................ G06F 1/1628 348/791 |
| 8,144,461 B2 * | 3/2012 | Lin .......................... A45C 5/02 361/679.55 |
| 2006/0087807 A1 * | 4/2006 | Suzuki ................ B60R 11/0264 361/679.01 |
| 2007/0158221 A1 * | 7/2007 | Lin .......................... A45C 5/02 206/320 |

FOREIGN PATENT DOCUMENTS

KR 101416208 7/2014

* cited by examiner

*Primary Examiner* — Anthony Haughton
(74) *Attorney, Agent, or Firm* — The Farrell Law Firm, P.C.

(57) ABSTRACT

An electronic device is provided. The electronic device includes a first flexible member, a rigid member positioned on one surface of the first flexible member, and a second flexible member positioned on the one surface of the first flexible member in at least a part of a periphery of the rigid member. The first flexible member is attached to a case member of the electronic device with the rigid member and the second flexible member being interposed therebetween.

17 Claims, 8 Drawing Sheets

ELECTRONIC DEVICE AND CASE MEMBER

PRIORITY

This application claims priority under 35 U.S.C. §119(a) to a Korean Patent Application filed in the Korean Intellectual Property Office on Dec. 24, 2014, and assigned Application Serial No. 10-2014-0188045, the entire contents of which are incorporated herein by reference.

BACKGROUND

1. Field of the Invention

The present disclosure generally relates to an electronic device, in particular, an electronic device and a case member for the electronic device.

2. Description of the Related Art

Recently, various types of electronic devices, such as a portable phone, a tablet Personal Computer (PC), an MP3 player, a Portable Multimedia Player (PMP), and an e-book, have been provided, and users access various contents through such electronic devices. In an electronic device, diverse functions, such as a multimedia function of reproducing a photograph, music, a video image, or the like, and an entertainment function of a game or the like, have been integrated with a wireless transmission/reception function. In addition, as electronic devices have recently become lighter in weight and have improved power efficiency, the users may use the electronic devices regardless of time or location, and thus the use of electronic devices has become ubiquitous.

An electronic device includes a display device that is provided on one surface thereof to output diverse contents, such as a photograph and video image, to a screen. Recently, a display device equipped with a touch screen function is provided on a front surface of an electronic device to replace a physical input device, so that a screen having a sufficient size can be provided, even in an electronic device of limited size.

As the use of an electronic device has become generalized, the electronic device may be utilized as an instrument for expressing a user's personality, as well as for performing its own functions. For example, the user may express his/her personality by modifying an exterior color or texture of the electronic device.

SUMMARY

The present disclosure has been made to address the above-mentioned problems and disadvantages, and to provide at least the advantages described below. Accordingly, embodiments of the present disclosure provide an electronic device that includes a first flexible member; a rigid member positioned on one surface of the first flexible member; and a second flexible member positioned on the one surface of the first flexible member in at least a part of a periphery of the rigid member. The first flexible member is attached to a case member of the electronic device with the rigid member and the second flexible member interposed between the first flexible member and the case member.

In addition, the present disclosure provides a case for an electronic device, with the case including a case member made of a rigid material; a first flexible member positioned on one surface of the case member; a rigid member between the case member and the first flexible member and positioned on one surface of the first flexible member; and a second flexible member between the case member and the first flexible member and positioned on the one surface of the first flexible member around the rigid member.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EMBODIMENTS OF THE PRESENT DISCLOSURE

Figure 1:
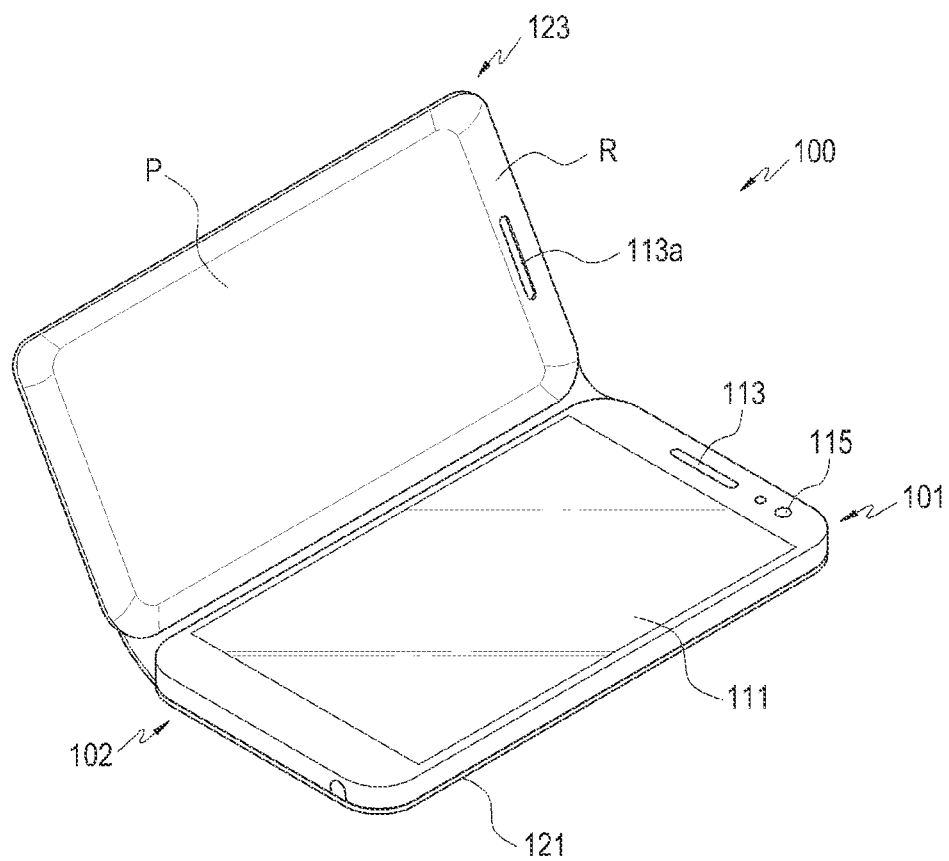
FIG. 1 is a perspective view illustrating an electronic device according to an embodiment of the present disclosure.

Herein, embodiments of the present disclosure are described with reference to specific embodiments in detail. However, it should be understood that the present disclosure is not limited to the specific embodiments, but the present disclosure includes all modifications, equivalents, and alternatives within the spirit and the scope of the present disclosure.

Although ordinal terms such as "first" and "second" may be used to describe various elements, these elements are not limited by these terms. Rather, the terms are used merely to distinguish an element from other elements. For example, a first element could be referred to as a second element, and similarly, a second element could be also referred to as a first element without departing from the scope of the present disclosure. As used herein, the term "and/or" includes any and all combinations of one or more associated items.

Relative terms "a front surface", "a rear surface", "a top surface", "a bottom surface", and the like which are described with respect to the orientation in the drawings may be replaced by ordinal numbers such as "first" and "second". In the ordinal numbers such as first and second, their order are determined in the mentioned order or arbitrarily, and may not be arbitrarily changed if so described.

In the present disclosure, the terms are used to describe specific embodiments, and are not intended to limit the present disclosure. As used herein, singular forms also include plural forms, unless the context clearly indicates otherwise. In the description, it should be understood that the terms "include" or "have" indicate existence of a feature, a number, a step, an operation, a structural element, parts, or a combination thereof, and do not previously exclude the existence or probability of addition of one or more another features, numeral, steps, operations, structural elements, parts, or combinations thereof.

Unless otherwise defined, all terms used herein, which include technical terminologies or scientific terminologies, have the same meaning as that understood by a person skilled in the art to which the present disclosure belongs. Terms defined in a generally used dictionary are to be interpreted to have the same meanings as the contextual meanings in the relevant field of art, and are not to be interpreted to have ideal or excessively formal meanings unless clearly defined in the present disclosure.

In the present disclosure, an electronic device may be referred to as a terminal, a portable terminal, a mobile terminal, a communication terminal, a portable communication terminal, a portable mobile terminal, a display device or the like.

For example, the electronic device may be a smartphone, a portable phone, a game player, a TV, a display unit, a heads-up display unit for a vehicle, a notebook computer, a laptop computer, a tablet PC, a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or may operate by interworking with the external electronic device. For example, the electronic device may transmit an image photographed by a camera and/or position information detected by a sensor unit to the server through a network. The network can include a mobile or cellular communication network, a Local Area Network (LAN), a Wireless Local Area Network (WLAN), a Wide Area Network (WAN), an Internet, a Small Area Network (SAN) or the like, but is not limited thereto.

A user's personality may be expressed using a removable protection cover, a character accessory, or the like, which may be a financial burden to a user. However, modification by the user of an exterior of the electronic device may result in mutilation of the exterior of the electronic device, or may cause difficulty in operating the electronic device. Embodiments of the present disclosure provide a case, of which an exterior texture can be diversified, and an electronic device that includes the case. The case can satisfy various users' tastes, and an electronic device that includes the case is also provided. Embodiments of the present disclosure provide a case that provides a soft tactile impression by using natural leather, synthetic leather, or the like, on the exterior thereof. The present disclosure also provides a case to which a material with a soft feeling is stably attached, even if a curved surface is formed on the exterior thereof.

Unlike a conventional electronic device, of which the exterior is made of a rigid material, such as a synthetic resin or a metal, the electronic device according to the present disclosure provides diverse colors or tactile impressions because a material with a soft feeling, such as natural leather or synthetic leather, is attached to a case member. Accordingly, a user may configure the exterior of the electronic device to be suitable for his/her own personality or taste, without applying an arbitrary modification to the exterior of the electronic device. Accordingly, a case and an electronic device are provided that prevent damage by an arbitrary modification or the like. In addition, a case and an electronic device are provided that can secure a sufficient attachment between a case member made of a rigid material and a material with a soft feeling, i.e., a first flexible member, by providing a rigid member or a second flexible member between the case member and the material with a soft feeling depending on the shape of the attachment surface.

Figure 2:
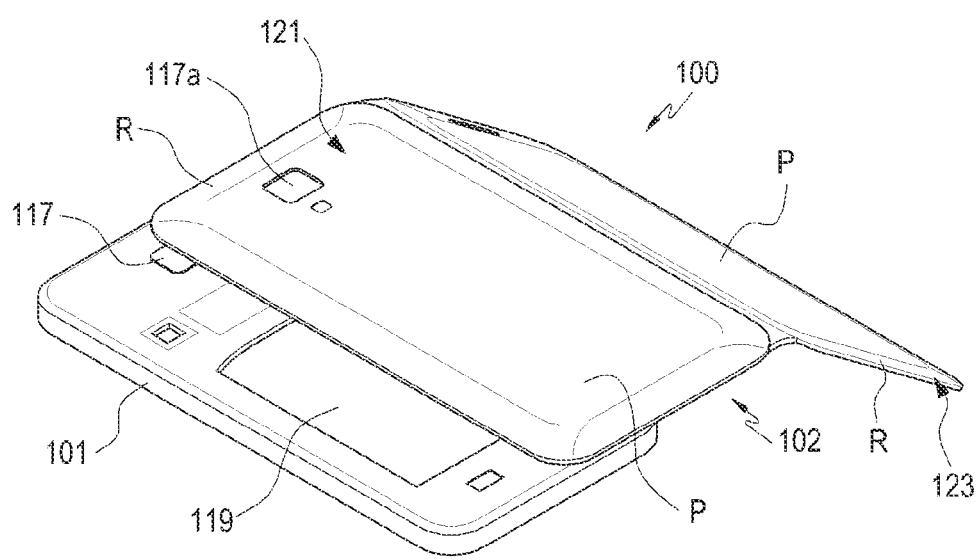
FIG. 2 is a perspective view illustrating the electronic device according to an embodiment of the present disclosure in a state where a case is separated from a main body.

FIG. 1 is a perspective view illustrating an electronic device 100 according to an embodiment of the present disclosure. FIG. 2 is a perspective view illustrating the electronic device 100 according to an embodiment of the present disclosure in a state where a case 102 is separated from a main body 101.

Referring to FIGS. 1 and 2, the electronic device 100 includes the main body 101, and the case 102 removably provided on the main body 101.

The main body 101 includes a display device 111 provided on the front surface thereof. The display device 111 outputs various contents, such as a photograph or a video image, to a screen, and may be equipped with a touch screen function to implement an input device, such as a key pad, on the screen. Various sensor modules may be embedded in the main body 101. For example, a gyro sensor, an illuminance sensor 115, or the like may be provided to detect an environment in which the electronic device 100 is used. The electronic device 100 is provided with a proximity sensor to control the activation/deactivation of the display device by detecting whether the user's body portion comes close thereto. A sound output device 113 may be mounted on a side of the display device 111 to output a sound while the voice call function or the multimedia function is executed.

On a rear surface of the main body 101, a camera module 117 may be mounted. By including the camera module 117, the electronic device 100 may take a photograph or a video image. A lighting device may be mounted on the rear surface of the main body 101, adjacent to the camera module 117. The lighting device provides lighting in a dark environment, such as at night or in an indoor space, to facilitate photographing. When the case 102 is removably provided on the main body 101, a battery mounting recess 119 is formed on the rear surface of the main body 101. For example, the electronic device 100 may include a removable battery.

When the user uses the electronic device 100 while carrying the electronic device 100, a battery with a limited capacity may be used. When the electronic device 100 includes the removable battery, the user may partially solve the problem of the limited battery capacity by carrying an auxiliary battery. The case 102 may be integrally formed with the main body 101. When the case 102 is integrally formed with the main body 101, the electronic device 100 may include an embedded battery.

Figure 3:
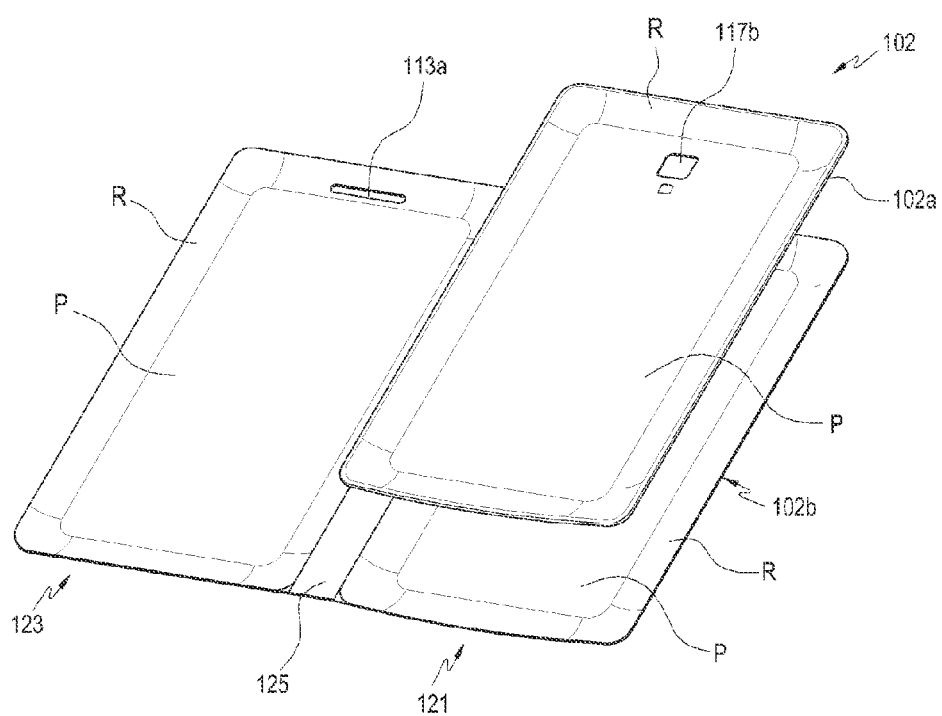
FIG. 3 is a perspective view illustrating a case of an electronic device according to an embodiment of the present disclosure.

The case 102 may be removably provided on the main body 101. While the specific embodiment of the present disclosure provides a configuration in which the case 102 is removably provided on the main body 101, the present disclosure is not limited thereto. For example, the case 102 may be integrally implemented on the main body 101. The case 102 includes a fixed portion 121 that is removably provided on the rear surface of the main body 101, and a cover portion 123 that opens/closes from/to the front surface of the main body 101. The fixed portion 121 and the cover portion 123 are pivotably interconnected by a hinge portion 125 (FIG. 3).

Each of the fixed portion 121 and the cover portion 123 are implemented to correspond to the shape of the main body 101. For example, the fixed portion 121 includes a planar portion P having a planar plate shape, and a round portion R having a round shape so that the fixed portion 121 is matched with a shape of the rear surface of the main body 101. The round portion R is formed to surround the planar portion P, for example, along the edges on the rear surface of the main body 101. Similar to the fixed portion 121, the cover portion 123 includes a planar portion P and a round portion R, and when the entire front surface of the main body 101 has a planar plate shape, the cover portion 123 may also be formed in the planar plate shape. In a state where the fixed portion 121 is mounted on the main body 101, the cover portion 123 may be pivoted with respect to the fixed portion 121 so as to open/close the front surface of the main body 101, for example, the display device 111.

Various openings are formed in each of the fixed portion 121 and the cover portion 123. A first opening 117a, formed in the fixed portion 121, is formed at a position corresponding to the camera module 117 to provide an imaging path of the camera module 117. A second opening 113a, formed in the cover portion 123, is formed at a position corresponding to the sound output device 113 to ensure that the sound is smoothly output, even when the cover portion 123 closes to cover the front surface of the main body 101.

Although a configuration in which the case 102 includes the fixed portion 121 and the cover portion 123 is described above, the present disclosure is not necessarily limited thereto. For example, the case 102 of the electronic device 100 can be configured with only with the fixed portion 121, so that the case 102 is not provided with the cover portion 123. When the cover portion 123 is provided, various accessory devices may be mounted on the cover portion 123. For example, a pocket for accommodating a business card, a credit card, or the like, an antenna member for short distance communication, such as Bluetooth, or for wireless charging, or a photoelectric conversion element for solar charging may be mounted on the cover portion 123.

Hereinafter, a configuration of a case according to the present disclosure will be described with reference to FIGS. 3 to 7.

Figure 4:
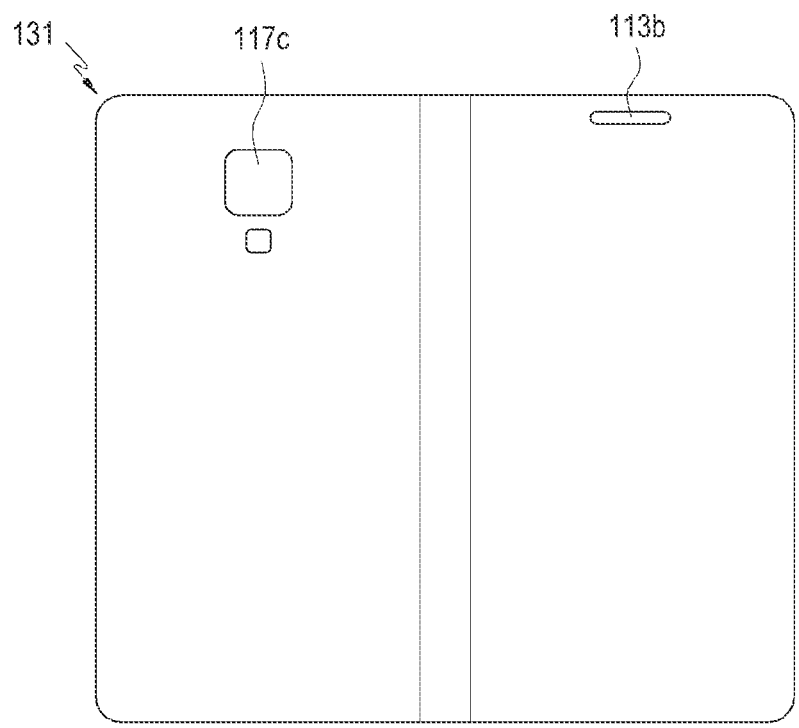
FIG. 4 is a plan view illustrating a first flexible member of the case according to an embodiment of the present disclosure.
Figure 5:
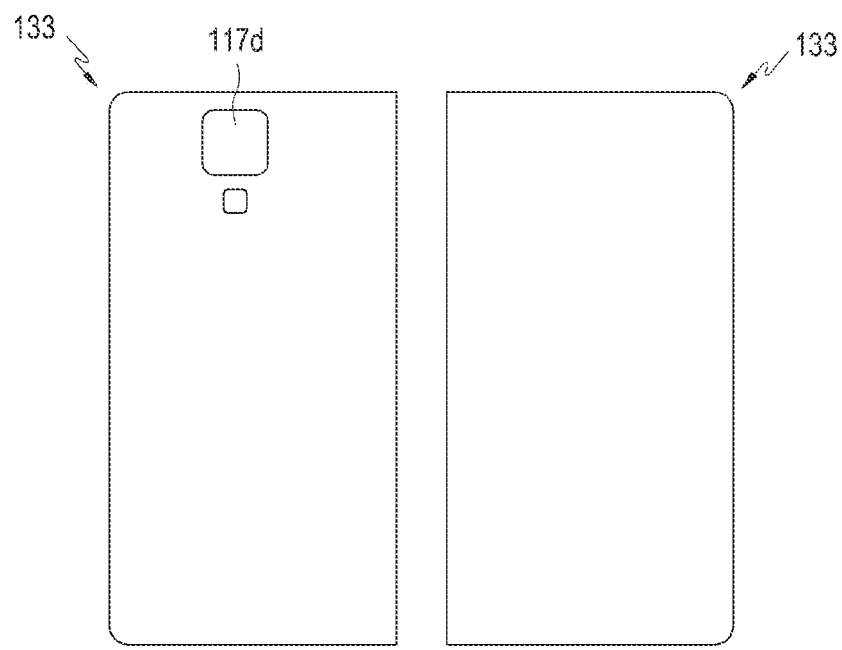
FIG. 5 is a plan view illustrating a rigid member of the case according to an embodiment of the present disclosure.
Figure 6:
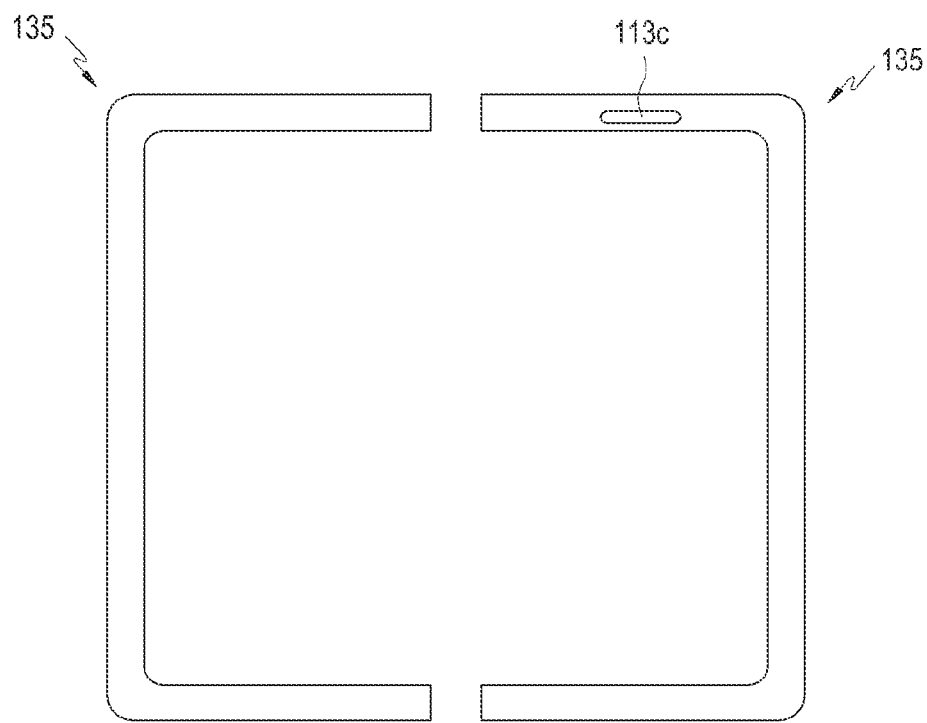
FIG. 6 is a plan view illustrating a second flexible member of the case according to an embodiment of the present disclosure.
Figure 7:
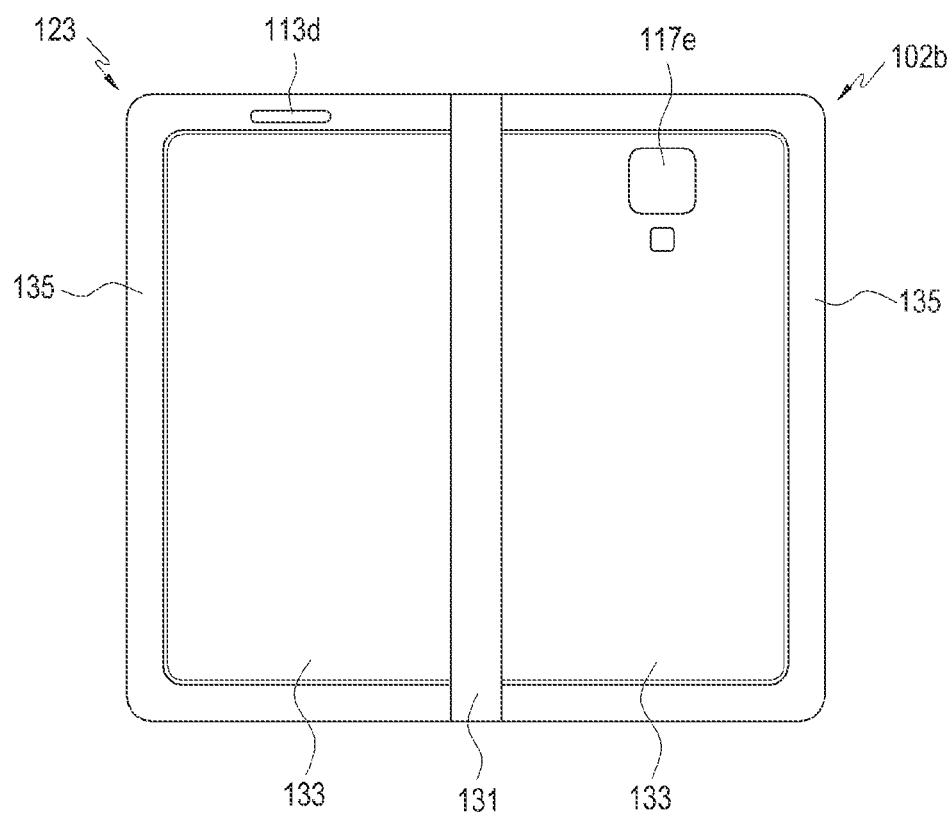
FIG. 7 is a plan view illustrating the case according to an embodiment of the present disclosure in a state where the case member is removed from an inner surface of the case.

FIG. 3 is a perspective view illustrating the case 102 of an electronic device according to an embodiment the present disclosure. FIG. 4 is a plan view illustrating a first flexible member of the case 102 according to an embodiment of the present disclosure. FIG. 5 is a plan view illustrating a rigid member of the case 102 according to an embodiment of the present disclosure. FIG. 6 is a plan view illustrating a second flexible member of the case 102 according to an embodiment of the present disclosure. FIG. 7 is a plan view illustrating the case 102 according to an embodiment of the present disclosure in the state where the case member is removed from an inner surface of the case.

Referring to FIGS. 3 to 7, the case 102 includes a rigid material portion and a flexible material portion 102b.

The rigid material portion of the case 102 is formed of a case member 102a that is made of a rigid material, such as a synthetic resin or a metal. The case member 102a has a shape which matches with a shape of the rear surface of the main body 101. For example, the case member 102a includes a planar portion P, and a round portion R formed around the planar portion P. The case member 102a includes a through-hole 117b for forming the first opening 117a and binding structures, which may be bound to the rear surface of the main body 101, may be formed on the inner surface of the case member 102a.

While FIG. 3 illustrates a structure in which the case member 102a is disposed only in the area corresponding to the fixed portion 121, another case member, made of a rigid material, is also included in the cover portion 123. For example, the cover portion 123 has a configuration in which the surface of the case member 102a made of a rigid material is enclosed by a flexible material. The cover portion 123, configured to open/close the front surface of the main body 101, does not require a separate binding structure or the like. Thus, the rigid material portion forming a part of the cover portion 123 may be implemented to be thinner than the case member 102a of the fixed portion 121.

The flexible material portion 102b of the case 102 forms at least a part of the exterior of the electronic device 100. For example, the flexible material portion 102b forms the rear surface of the electronic device 100.

Referring to FIG. 4, the flexible material portion 102b includes a first flexible member 131. The first flexible member 131 may be made of, for example, a flexible material, such as natural leather or synthetic leather, and may be positioned on the outer surface of the electronic device 100, to provide a soft feeling. The first flexible member 131 includes through holes 113b and 117c that are formed at positions corresponding to the sound output device 113 and the camera module 117, respectively. Since the first flexible member 131 is attached to the outer surface of the case member 102a, the outer surface of the electronic device 100 provides a soft feeling.

In order to strengthen an attachment force, i.e., adhesive affinity, in attaching the first flexible member 131 to the case member 102a, the flexible material portion 102b includes a rigid member 133 and a second flexible member 135.

Referring to FIGS. 5 to 7, the rigid member 133 and the second flexible member 135 are attached to the inner surface of the first flexible member 131, to ensure that the first flexible member 131 can be stably attached and fixed to the case member 102a. Prior to being attached and fixed to the case member 102a, the first flexible member 131 or the like has a planar plate shape. The rigid member 133 may be made of a synthetic region, such as a polycarbonate sheet, and is disposed to correspond to the planar portion P of the case 102. When the first flexible member 131 is directly attached to the outer surface of the case member 102a, flexures formed on the outer surface of the case member 102a may be visible on the outer surface of the first flexible member 131, thereby degrading the exterior. For example, when a defect caused by scratching or the like, exists on the outer surface of the case member 102a, the flexures existing on the outer surface of the case member 102a may be visible on the outer surface of the first flexible member 131. The rigid member 133 is attached to the inner surface of the first flexible member 131 to block the defect existing on the surface of the case member 102a from being externally visible, so that an intrinsic touch and exterior intended to implement through the first flexible member 131 can be implemented.

The second flexible member 135 may be made of fiber, such as taffeta, and may be positioned on one surface of the first flexible member 131 around the rigid member 133. For example, the second flexible member 135 may be attached to face one surface of the first flexible member 131 and disposed to correspond to the round portion R of the case member 102a. When the rigid member 133 is attached to the round portion R to attach the flexible material portion 102b to the case member 102a, the edge portions may be detached from the case member 102a by the elastic resilience of the rigid member 133. The second flexible member 135 is disposed and attached to correspond to the round portion R of the case member 102a, so that the flexible material portion 102b is prevented from being detached from the round portion R of the case member 102a at the edges of the case 102. For example, the rigid member 133 can attach the first flexible member 131 to the case member 102a in the planar portion P, and the second flexible member 135 can attach the first flexible member 131 to the case member 102a in the round portion R.

The rigid member 133 and the second flexible member 135 also include through-holes 113c and 117d, respectively, which are formed at the positions corresponding to the sound output device 113 and the camera module 117, respectively. When the case member 102a, the first flexible member 131, the rigid member 133, and the second flexible member 135 are assembled, the through-holes 113b, 113c, 113d, 117b, 117c, 117d, and 117e, which are respectively formed therein, are properly aligned to form the first and second openings 113a and 117a, respectively.

A coating layer 143 (see FIG. 11) is formed along the edge of the flexible material portion 102a using an elastic material such as rubber, silicon, or urethane. By forming the coating layer 143 on the edge of the flexible material portion 102b, a lamination structure of the first flexible member 131, the second flexible member 135, and an adhesive layer 137 to be described below can be concealed. Even if the flexible material portion 102b is formed in the planar plate shape, a fiber material having high adhesion affinity with the coating layer 143 formed of an elastic material as described above, such as the second flexible member 135, is disposed on the edge.

Figure 8:
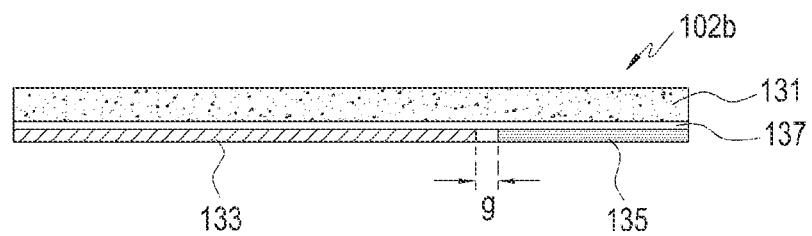
FIG. 8 is a sectional view illustrating the case according to an embodiment of the present disclosure in the state where the case member is removed from the inner surface.

FIG. 8 is a sectional view illustrating the case 102 according to an embodiment the present disclosure in the state where the case member is removed from the inner surface thereof.

Because the case 102 includes the adhesive layer 137 (e.g., a thermal fusion layer) provided on one surface (e.g., the inner surface) of the first flexible member 131, the rigid member 133 and the second flexible member 135 can be attached to the first flexible member 131. When the rigid member 133 and the second flexible member 135 are attached to the first flexible member 131, a gap, for example a gap g in the range of 0.1 mm to 0.3 mm, is formed between rigid member 133 and the second flexible member 135. In the process of attaching the second flexible member 135 to the round portion R, a displacement occurs in the length or surface area of the first flexible member 131, depending on the thickness of the flexible material portion 102b. For example, in the process of attaching the second flexible member 135 to the round portion R, the second flexible member 135 may come close to the rigid member 133. When the second flexible member 135 comes close to the rigid member 133 and is superimposed on the rigid member 133, a flexure is formed on the exterior of the first flexible member 131. According to an embodiment of the present disclosure, in consideration of the displacement in the attachment process, the gap g can be secured between the rigid member 133 and the second flexible member 135, when configuring the flexible material portion 102b in the planar plate state.

The rigid member 133 and the second flexible member 135 can be attached to the first flexible member 131 by forming the adhesive layer 137 on the one surface of the first flexible member 131, aligning the rigid member 133 and the second flexible member 135, and then pressing the rigid member 133 and the second flexible member 135 using a roller or a press. When the adhesive layer 137 is formed of a thermal fusion type adhesive, adhesion time is reduced by applying heat of a predetermined level in the process of pressing using the roller or the press.

Figure 9:
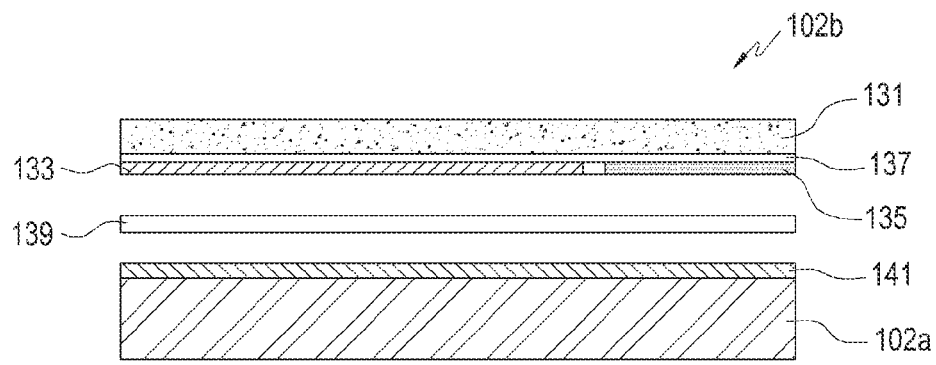
FIG. 9 is a sectional view illustrating a cross-sectional configuration of the case according to an embodiment of the present disclosure.
Figure 10:
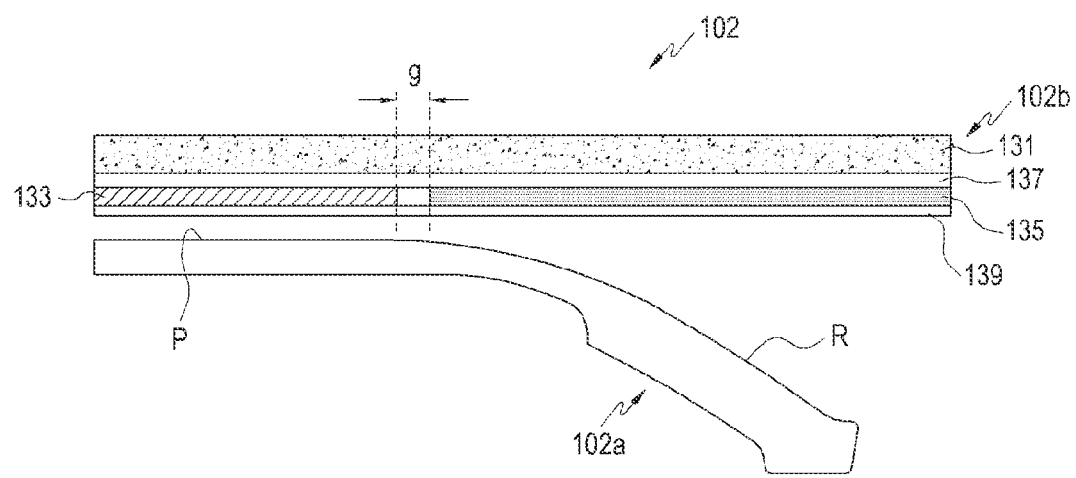
FIG. 10 is a sectional view illustrating a process of attaching the first flexible member of the case to the case member according to an embodiment of the present disclosure.

FIG. 9 is a sectional view illustrating a cross-sectional configuration of the case 102 according to an embodiment of the present disclosure. FIG. 10 is a sectional view illustrating a process of attaching the first flexible member of the case 102 to the case member according to an embodiment of the present disclosure.

The flexible material portion 102b is attached to one surface of the case member 102a, for example, the outer surface of the case member 102a. The flexible material portion 102b can be attached to a rigid material portion, for example, the case member 102a through a thermal pressing method. For example, between the flexible material portion 102b and the case member 102a, a thermal fusion layer 139 is disposed so that the flexible material portion 102b can be attached to the outer surface of the case member 102a. By attaching the flexible material portion 102b to the case member 102a, an elastic material layer 141 can be formed on the outer surface of the case member 102a. For example, in order to increase the adhesion affinity between the flexible material portion 102b and the case member 102a, a layer, i.e., an elastic material layer, is formed of an elastic material, such as rubber, silicon, or urethane, on the outer surface of the case member 102a. The elastic material layer 141 is formed by coating the elastic material on the surface of the case member 102a. By forming the elastic material layer 141 on the surface of the case member 102a, the adhesion affinity between the thermal fusion layer 139 and the case member 102a can be improved. The flexible material portion 102b can be attached to the case member 102a by pressing the flexible material portion 102b by the roller or the press, and the adhesion time can be reduced by applying heat in the process of pressing the flexible material portion 102b against the case member 102a.

Figure 11:
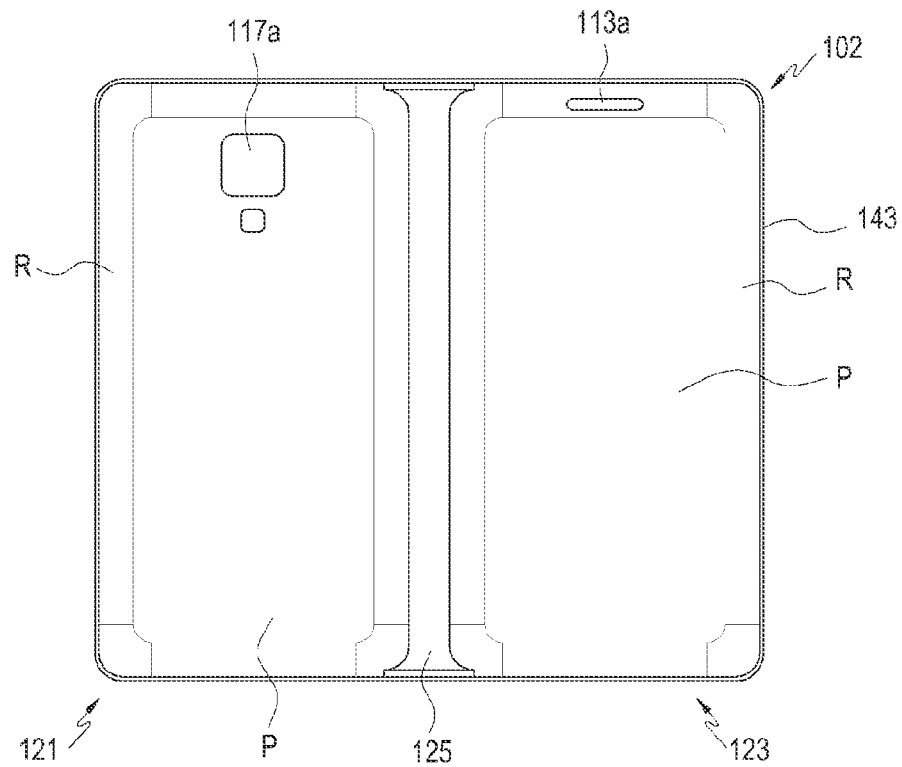
FIG. 11 is a plan view of an outer surface of the case according to an embodiment of the present disclosure.

FIG. 11 is a plan view illustrating the outer surface of the case 102 according to an embodiment of the present disclosure.

As described above, the case 102 includes a fixed portion 121 and a cover portion 123, and each of the fixed portion 121 and the cover portion 123 includes a planar portion P and a round portion R. The fixed portion 121 is formed in a shape that is matched with a shape of the rear surface of the above-described electronic device main body 101 and the cover portion 123 is formed in a shape corresponding to the shape of the front shape of the main body 101. However, the case is not necessarily limited to the shape illustrated to FIG. 11. For example, when the entire front surface of the main body 101 is formed as a planar surface, the cover portion 123 is formed in a planar plate shape without the above-described round portion R. The cover portion 123 is pivotally connected to the fixed portion 121 through the hinge portion 125, and the hinge portion 125 is formed by a part of the first flexible member 131. For example, in configuring the flexible material portion 102b, the rigid member 133 or the second flexible member 135 is not attached to the area that corresponds to the hinge portion 125 so that the pivot of the cover portion 123 can be smoothly performed. As described above, the coating layer 143 is formed along the edges of the case 102, in which the coating layer 143 is formed to enclose the inner surface and the outer surface in the edges of the case 102 (e.g., the flexible material portion 102b).

As described above, according to the present disclosure, an electronic device is provided that includes a first flexible member, a rigid member positioned on one surface of the first flexible member, and a second flexible member positioned on the one surface of the first flexible member in at least a part of a periphery of the rigid member. The first flexible member is attached to a case member of the electronic device with the rigid member and the second flexible member being interposed therebetween.

According to the present disclosure, the case member is formed of a rigid material including a synthetic resin or a metal; the second flexible member is attached to a round portion of the case member; the rigid member is attached to a planar portion of the case member; and the rigid member is formed of a rigid material including a synthetic resin.

According to the present disclosure, the electronic device further includes a thermal fusion layer formed on the one surface of the first flexible member. The rigid member and the second flexible member are fixed to the first flexible member by the thermal fusion layer.

According to the present disclosure, the electronic device further includes a second thermal fusion layer formed on one surface of the case. The rigid member and the second flexible member are attached to the case member by the second thermal fusion layer.

According to the present disclosure, the electronic device further includes an elastic material layer formed on one surface of the case member. The second thermal fusion layer causes the rigid member and the second flexible member to be attached to the case member together with the elastic material layer.

According to the present disclosure, the second flexible member is disposed along an edge of the first flexible member around the rigid member.

According to the present disclosure, the first flexible member is formed of a flexible material including natural leather and synthetic leather; and the second flexible member is spaced apart from the edge of the rigid member with a gap in a range of 0.1 mm to 0.3 mm.

The present disclosure provides a case for an electronic device. The case includes a case member made of a rigid material including a synthetic resin and a metal, a first flexible member positioned on one surface of the case member, a rigid member disposed between the case member and the first flexible member and positioned on one surface of the first flexible member, and a second flexible member disposed between the case member and the first flexible member and positioned on the one surface of the first flexible member around the rigid member.

According to the present disclosure, the case member includes a planar portion and a peripheral portion disposed to surround the planar portion. The rigid member is attached to the planar portion and the second flexible member is attached to the peripheral portion.

According to the present disclosure, the peripheral portion is formed as a round portion.

According to the present disclosure, the case further includes a thermal fusion layer interposed between the first flexible member and the rigid member, between the first flexible member and the second flexible member, between the case member and the rigid member, and/or between the case member and the second flexible member.

According to the present disclosure, the case further includes an elastic material layer formed on one surface of the case member. At least one of the rigid member and the second flexible member is attached to the case member through the elastic material layer.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An electronic device comprising:
 a first flexible member;
 a rigid member positioned on a bottom surface of the first flexible member; and
 a second flexible member positioned on the bottom surface of the first flexible member in at least a part of a periphery of the rigid member,
 wherein a portion of the first flexible member is attached to a top surface of a case member of the electronic device with the rigid member and another portion of the first flexible member is attached to the case member with the second flexible member, and
 wherein the rigid member and the second flexible member are interposed between the bottom surface of the first flexible member and the top surface of the case member, respectively.

2. The electronic device of claim 1, wherein the case member is formed of a rigid material including one of a synthetic resin and a metal.

3. The electronic device of claim 1, wherein the second flexible member is attached to a round portion of the top surface of the case member.

4. The electronic device of claim 1, wherein the rigid member is attached to a planar portion of the top surface of the case member.

5. The electronic device of claim 4, wherein the rigid member is formed of a rigid material including a synthetic resin.

6. The electronic device of claim 1, further comprising:
 a first thermal fusion layer formed on the bottom surface of the first flexible member,
 wherein the rigid member and the second flexible member are fixed to the bottom surface of the first flexible member by the first thermal fusion layer.

7. The electronic device of claim 6, further comprising:
 a second thermal fusion layer formed on the top surface of the case member,
 wherein the rigid member and the second flexible member are attached to the top surface of the case member by the second thermal fusion layer.

8. The electronic device of claim 7, further comprising:
 an elastic material layer formed on the top surface of the case member,
 wherein the second thermal fusion layer causes the rigid member and the second flexible member to be attached to the top surface of the case member together with the elastic material layer.

9. The electronic device of claim 1, wherein the second flexible member is disposed along an edge of the first flexible member, surrounding the rigid member.

10. The electronic device of claim 1, wherein the first flexible member is formed of a flexible material including one of natural leather and synthetic leather.

11. The electronic device of claim 1, wherein the second flexible member is spaced apart from the edge of the rigid member with a gap in a range of 0.1 mm to 0.3 mm.

12. A case for an electronic device, the case comprising:
 a case member made of a rigid material;
 a first flexible member positioned on a top surface of the case member;

a rigid member disposed between the top surface of the case member and a bottom of the first flexible member; and a second flexible member disposed between the top surface of the case member and the bottom surface of the first flexible member and positioned on the bottom surface of the first flexible member around the rigid member, wherein a portion of the first flexible member is attached to the case member with the rigid member and another portion of the first flexible member is attached to the case member with the second flexible member.

13. The case of claim 12, wherein the top surface of the case member includes a planar portion and a peripheral portion surrounding the planar portion, and wherein the rigid member is attached to the planar portion and the second flexible member is attached to the peripheral portion.

14. The case of claim 13, wherein the peripheral portion is formed as a round portion.

15. The case of claim 12, further comprising:

a thermal fusion layer interposed between one or more of the bottom surface of the first flexible member and a top surface of the rigid member, the bottom surface of the first flexible member and a top surface of the second flexible member, the top surface of the case member and a bottom surface of the rigid member, and the top surface of the case member and a bottom surface of the second flexible member.

16. The case of claim 12, further comprising:

an elastic material layer formed on the top surface of the case member, wherein at least one of the rigid member and the second flexible member is attached to the top surface of the case member by the elastic material layer.

17. The case of claim 12, wherein the rigid material of the case member is one of a synthetic resin and a metal.

* * * * *